(12) United States Patent
Mehta et al.

(10) Patent No.: US 12,223,559 B1
(45) Date of Patent: Feb. 11, 2025

(54) NATURAL LANGUAGE PROCESSING ANALYSIS OF LEGAL REQUIREMENTS

(71) Applicant: GM Cruise Holdings LLC, San Francisco, CA (US)

(72) Inventors: Kunal Mehta, San Francisco, CA (US); Brent Valle, Livermore, CA (US); Ruixin Ge, Hoboken, NJ (US)

(73) Assignee: GM Cruise Holdings LLC, San Francisco, CA (US)

( * ) Notice: Subject to any disclaimer, the term of this patent is extended or adjusted under 35 U.S.C. 154(b) by 526 days.

(21) Appl. No.: 17/561,549

(22) Filed: Dec. 23, 2021

(51) Int. Cl.
*G06Q 50/18* (2012.01)
*G06F 9/451* (2018.01)
*G06F 40/289* (2020.01)

(52) U.S. Cl.
CPC ............. *G06Q 50/18* (2013.01); *G06F 9/451* (2018.02); *G06F 40/289* (2020.01)

(58) Field of Classification Search
None
See application file for complete search history.

(56) References Cited

U.S. PATENT DOCUMENTS

2020/0111023 A1* 4/2020 Pondicherry Murugappan ........... G06N 5/02

FOREIGN PATENT DOCUMENTS

WO WO-2018195198 A1 * 10/2018 ....... G06F 16/24578

* cited by examiner

*Primary Examiner* — Jan P Mincarelli
(74) *Attorney, Agent, or Firm* — Wade C. Yamazaki

(57) ABSTRACT

A computer-aided method of comparing legal requirements, including: comparing a first legal requirement from a first jurisdiction to a second legal requirement from a second jurisdiction, including applying a natural language processing (NLP) algorithm to the first and second legal requirements; computing a distance between the first and second legal requirements; determining from the distance that the second legal requirement belongs to a same subject matter category as the first legal requirement; and providing a user interface (UI) to display the first and second legal requirements to a user, with the computed distance.

20 Claims, 8 Drawing Sheets

Fig. 7

NATURAL LANGUAGE PROCESSING ANALYSIS OF LEGAL REQUIREMENTS

FIELD OF THE SPECIFICATION

The present disclosure relates generally to infrastructure for autonomous vehicles (AVs) and more particularly, though not exclusively, to a system and method for providing natural language processing analysis of legal requirements.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to perceive the vehicle's environment accurately and quickly, including obstacles, signs, and traffic lights. The vehicles can be used to pick up passengers and drive the passengers to selected destinations. The vehicles can also be used to pick up packages and/or other goods and deliver the packages and/or goods to selected destinations.

AV behaviors must respect local legal requirements. When scaling AV service to different legal jurisdictions, an effective method for processing and understanding different legal requirements is needed.

SUMMARY

A computer-aided method of comparing legal requirements, including: comparing a first legal requirement from a first jurisdiction to a second legal requirement from a second jurisdiction, including applying a natural language processing (NLP) algorithm to the first and second legal requirements; computing a distance between the first and second legal requirements; determining from the distance that the second legal requirement belongs to a same subject matter category as the first legal requirement; and providing a user interface (UI) to display the first and second legal requirements to a user, with the computed distance.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIG. 7 is a block diagram of selected elements of an illustrative user interface.

DETAILED DESCRIPTION

Overview

Figure 1:
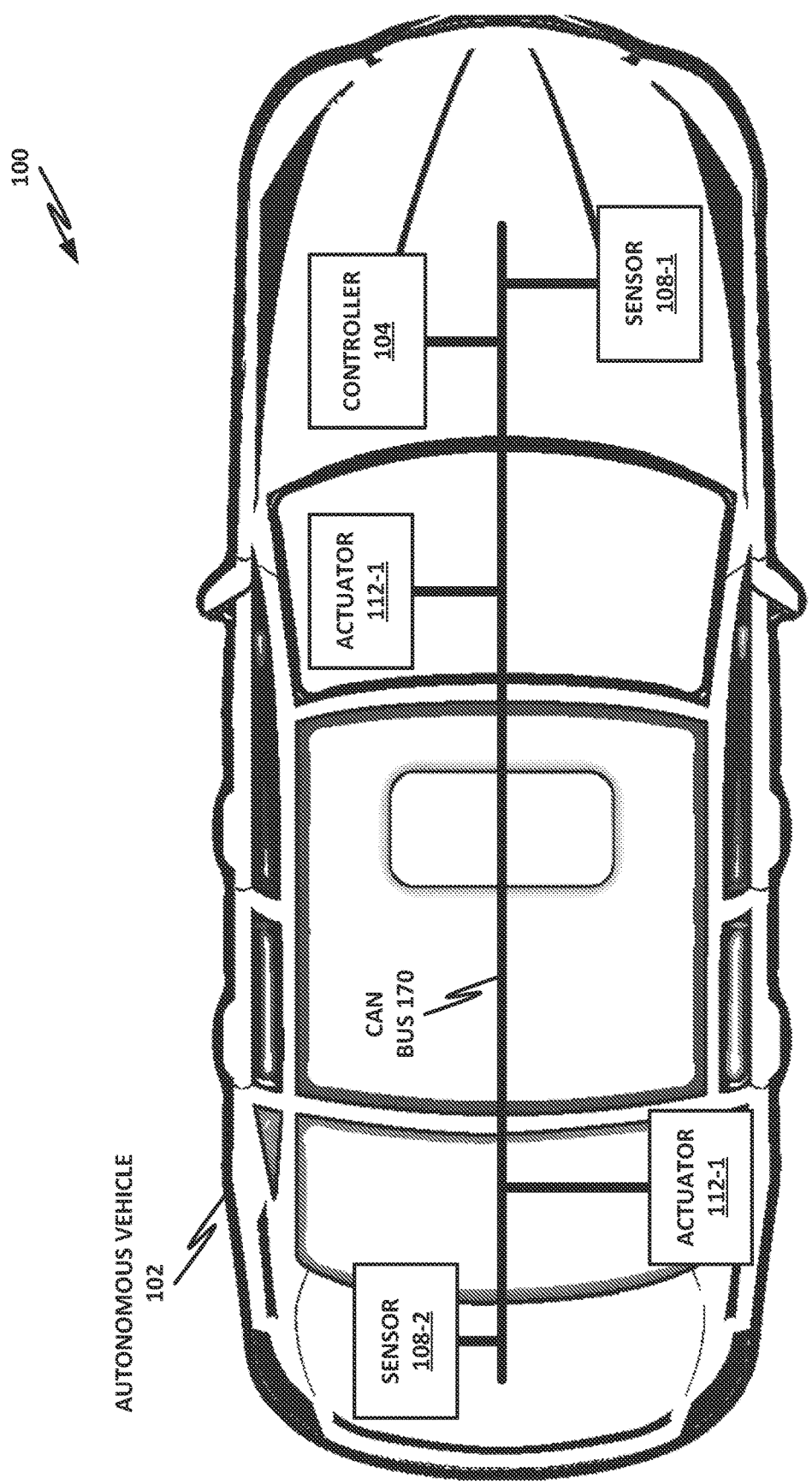
FIG. 1 is a block diagram illustrating an example autonomous vehicle.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One challenge with operating AVs in a federal republic like the United States is variations in traffic laws. An AV controller is concerned with operating a vehicle within the laws of the state in which the AV operating. And even within a single jurisdiction, there may be different levels of laws, such as federal, state, and local laws.

The United States includes 50 Sovereign States, each of which sets its own traffic codes. Thus, an AV controller that theoretically perfectly complies with the traffic codes of a first jurisdiction may not comply with the codes of a second jurisdiction. For example, it is nearly universal for cars to stop at red lights. But even this seemingly simple requirement can be complicated by edge cases. For example, what may a driver do in case of an emergency? Can a vehicle turn right on a red light and under what conditions? Can or should a vehicle enter the intersection on red to move out of the way for an emergency vehicle?

Thus, legal compliance may be a problem whose hardness and complexity scales with the number of jurisdictions. An AV controller may include a completely separate software suite for each individual jurisdiction, but with more than 50 separate jurisdictions in the United States alone (plus foreign considerations), such a solution may become untenable.

It is therefore advantageous to provide a system and method for computer-aided analysis for multi-jurisdiction legal compliance. The system described herein can advantageously assist in numerous phases of legal compliance. By way of illustrative and nonlimiting example, the system may analyze the text of statutes from multiple jurisdictions. A natural language processing (NLP) engine may condition the text, such as by tokenizing or lemmatizing the text.

In an example, the first 400 words of a statute may be treated as a sentence or pseudo-sentence. This "sentence" may include several sentences and paragraphs, but may be treated like a sentence for NLP purposes. A sentence-wise NLP Comparison may be used to compare the statute to other statutes in a data store. This may include, for example, computing a Jaccard similarity, cosine similarity, or other similarity between two statutes. If the similarity is above a threshold, then the statutes may be found to have common subject matter (e.g., both are red light statutes or both are stop sign statutes).

Additional NLP analysis may also identify differences found in the statutes. These differences are often implementation details in similar statutes. For example, statutes from state to state may specify different following distances, different stopping distances, different wait times at stop signs, or different conditions for turning right on red. However, even with these differences, the statutes may also share some commonality.

This analysis may be used to parameterize legal requirements. For example, the analysis engine may be able to suggest compliance activities that may be defined in a function and may also suggest factors that may form useful parameters in a function call.

With such function definitions, systems engineers may define APIs to call appropriate functions, including call-time parameters. Systems engineers may also be able to define data structures for representing compliance by jurisdiction.

For example, a systems engineer may define a function interface, such as:
StopAtStopSign( . . . );

Systems engineers may also define parameters that represent where to stop and how long to stop (e.g., 2 seconds, 2.5 seconds, 3 seconds, proceed after full stop, etc.). One or more data structures may store tables that correlate particular jurisdictions to the call-time parameters that cause the function to implement compliance with the laws of those jurisdictions.

In further examples, the system may calculate distances between various statutes and identify "clusters" of legal requirements. These clusters may include laws that group together by similarity. Clusters may be useful in identifying laws that are either identical or similar enough that compliance can be handled by a single function, which may use parameters to handle slight variations. In some cases, clusters may identify groups of laws that are incompatible, contradictory, or different enough that it makes sense to handle them with a separate function.

For example, the system may identify 12 states with similar red light laws and place them in a cluster A. The system may recommend a compliance function A to handle compliance in those 12 states. The system may also identify 14 additional states with red light laws that are different from cluster A but that group together themselves. The system may assign these 14 red light laws to cluster B and recommend a compliance function B.

The system may also recommend parameters for compliance function A and compliance function B, which may fine tune compliance within the group.

Embodiments may also identify strictest compliance rules either across the entire dataset or within a cluster. For example, the system may cluster stop sign laws into two clusters, one representing states with a minimum-time requirement and others with a "proceed after coming to a full stop" requirement. The automated system (or a systems engineer) may determine that these two regimens should be serviced by different software functions.

Assuming that cluster A is a cluster with specific time requirements, the system may identify "minimum-time" as a useful function call parameter. The system may also determine that states have varying stop time requirements, such as 2 seconds, 2. S seconds, and 3 seconds.

In that case, the system may identify 3 seconds as the strictest requirement in the cluster. Any vehicle that complies with the 3-second rule will comply with all states that have a specific time rule.

In that case, certain parts of the controller may optionally be simplified by collapsing all rules in a group into the strictest rule in the group. In a true strictest rule situation, compliance with the strictest rule guarantees compliance with all rules in the set.

Clustering and associations may also be used to drive UI elements. For example, a systems engineer may need to define an API for handling following distance. In an example UI, the engineer (who in this example is based in California) may request information about a known section of the California code that deals with following distance. When the engineer pulls up this section of the California code, the UI may present not only the relevant section but also cross-references to statutes in other states that relate to the same subject matter.

The system may also present to the engineer pseudocode or other suggestions regarding functionality. The system may also present to the engineer suggestions for which aspects of the function may be variables or parameters to help make the interface more general and applicable to more states.

The system may further provide one-on-one comparison between statutes. For example, if a California-based programmer is using the California Vehicle Code (CVC) as a baseline, the programmer may view the relevant section of the CVC on one side of the screen. On the other side, the programmer may see a corresponding statute for another jurisdiction. The UI may also display the computed similarity between the statutes, which may be normalized (e.g., a decimal value between zero and one).

Another valuable feature may include automatically generating a uniform code. For example, the system may use existing statutes to train an artificial intelligence (AI) model. The system may reconcile the disparate codes and generate one or more sections of a model uniform traffic code similar to other model codes like the Uniform Commercial Code or Uniform Trade Secrets Act. In one example, the system may use an autoregressive language model like Generative Pre-Trained Transformer 3 (GPT-3) or similar to generate the model code.

Embodiments may further provide test-related services. It may be desirable to test an AV controller's compliance with applicable laws to ensure that the AV operates within applicable laws. Because the NLP engine of the present specification is able to classify and cluster laws, including determining specific compliance parameters, the system may generate recommendations for a testing regimen.

This may include designing jurisdiction-specific tests to ensure compliance in that jurisdiction. The system may further design multi-jurisdiction tests, for example, to certify compliance between multiple jurisdictions with functionally identical requirements.

In the case of a cluster or dataset with a strictest rule, the system may design test parameters to prove compliance with the strictest rule. Compliance with the strictest rule may also imply compliance with less strict rules in the same category.

Embodiments of this specification are drawn to traffic codes for compliance models within an AV controller. However, this specification is not so limited. Other embodiments may provide comparison or reconciliation of other legal frameworks for both domestic and international jurisdictions. For example, the system may compare laws or statutes for voting, environmental laws or regulations, manufacturing standards, firearms ownership, operation, and licensing, academic regulations and standards among universities, intellectual property laws, and many others. The foregoing can be used to build or embody several example implementations, according to the teachings of the present specification. Some example implementations are included here as nonlimiting illustrations of these teachings.

DETAILED DESCRIPTION OF THE DRAWINGS

A system and method for providing NLP analysis of legal requirements will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example autonomous vehicle 102. Autonomous vehicle 102 may be, for example, an automobile, car, truck, bus, train, tram, funicular, lift, or similar. Autonomous vehicle 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not Intended to be limited to a particular vehicle or vehicle configuration.

In this example, autonomous vehicle 102 includes one or more sensors, such as sensor 108-1 and sensor 108-2. Sensors 108 may include, by way of illustrative and non-limiting example, localization and driving sensors such as photodetectors, cameras, radio detection and ranging (RADAR), SONAR, light detection and ranging (LIDAR), GPS, inertial measurement units (IMUs), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

Autonomous vehicle 102 may further include one or more actuators 112. Actuators 112 may be configured to receive signals and to carry out control functions on autonomous vehicle 102. Actuators may include switches, relays, or mechanical, electrical, pneumatic, hydraulic, or other devices that control the vehicle. In various embodiments, actuators 112 may include steering actuators that control the direction of autonomous vehicle 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of autonomous vehicle 102.

A controller 104 may provide the main control logic for autonomous vehicle 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of autonomous vehicle 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of autonomous vehicle 102 may communicate with one another via a bus such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. for example, in some cases bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols such as any of the family of institute of electrical and electronics engineers (IEEE) 802 family of communication protocols, including any version or subversion of 802.1 (higher layer local area network (LAN)), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 80.12 (100VG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as for example, InfiniBand, FibreChannel, FibreChannel over Ethernet (FCOE), Omni-Path, Lightning bus, or others. Bus 170 may also enable controller 104, sensors 108, actuators 112, and other systems and subsystems of autonomous vehicle 102 to communicate with external hosts, such as Internet-based hosts. In some cases, autonomous vehicle 102 may form a mesh or other cooperative network with other autonomous vehicles, which may allow sharing of sensor data, control functions, processing ability, or other resources.

Figure 8:
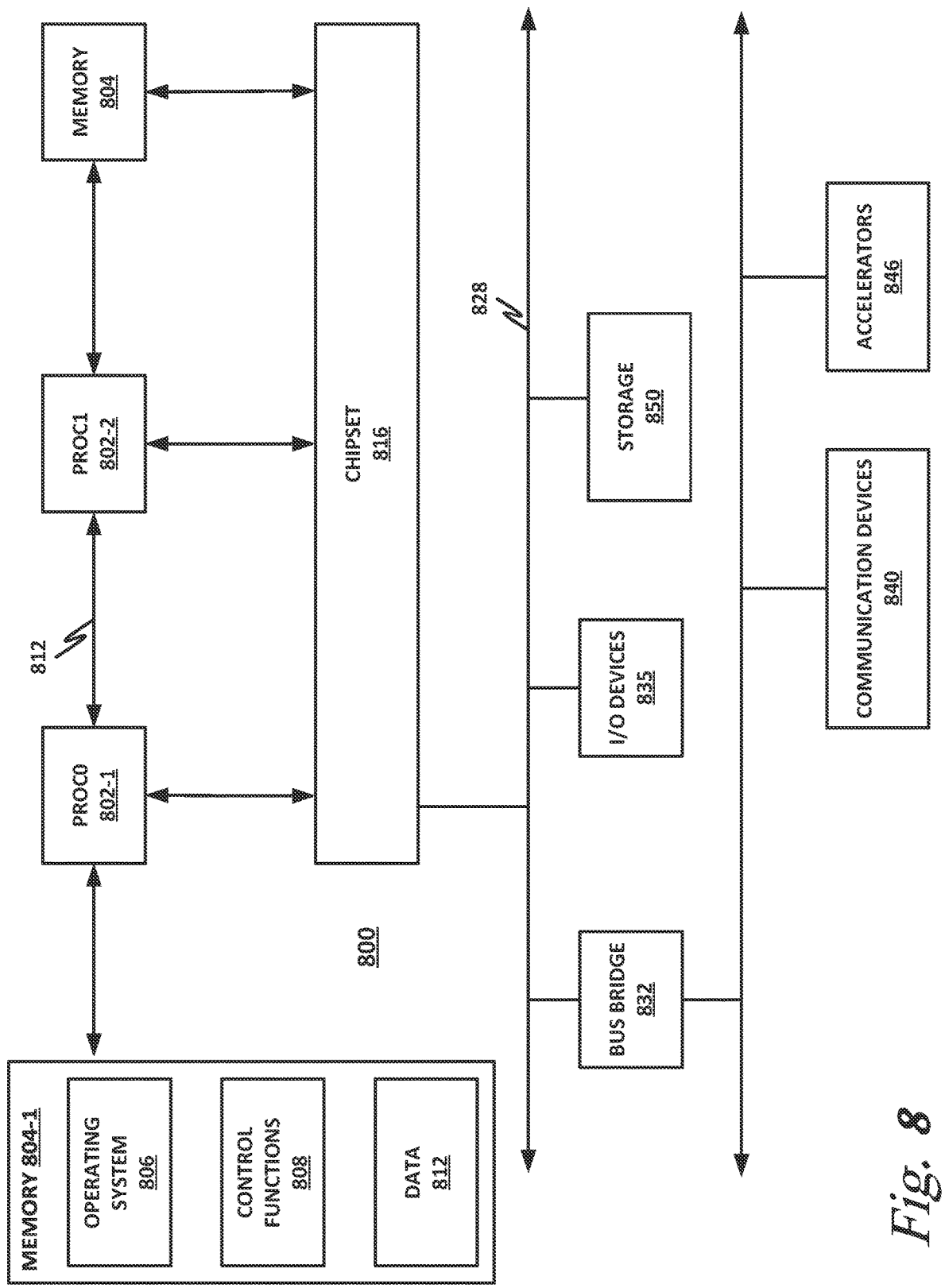
FIG. 8 is a block diagram of selected elements of a hardware platform.

Controller 104 may control the operations and functionality of autonomous vehicles 102, or one or more other autonomous vehicles. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the Internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by autonomous vehicles.

According to various implementations, autonomous vehicle 102 may modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

Autonomous vehicle 102 is illustrated as a fully autonomous automobile but may additionally or alternatively be any semi-autonomous or fully autonomous vehicle. In some cases, autonomous vehicle 102 may switch between a semi-autonomous state and a fully autonomous state and thus, some autonomous vehicles may have attributes of both a semi-autonomous vehicle and a fully autonomous vehicle depending on the state of the vehicle.

In operating AV 102, controller 104 may perform various compliance functions, such as complying with statutes or regulations. As autonomous vehicle 102 moves from state to state or otherwise moves between jurisdictions, those legal requirements may change. Thus, when a system programmer programs controller 104, he or she may need to be cognizant of the legal requirements in different jurisdictions. The teachings of the present specification can aid the system programmer in defining behaviors for different jurisdictions with different legal requirements.

Figure 2:
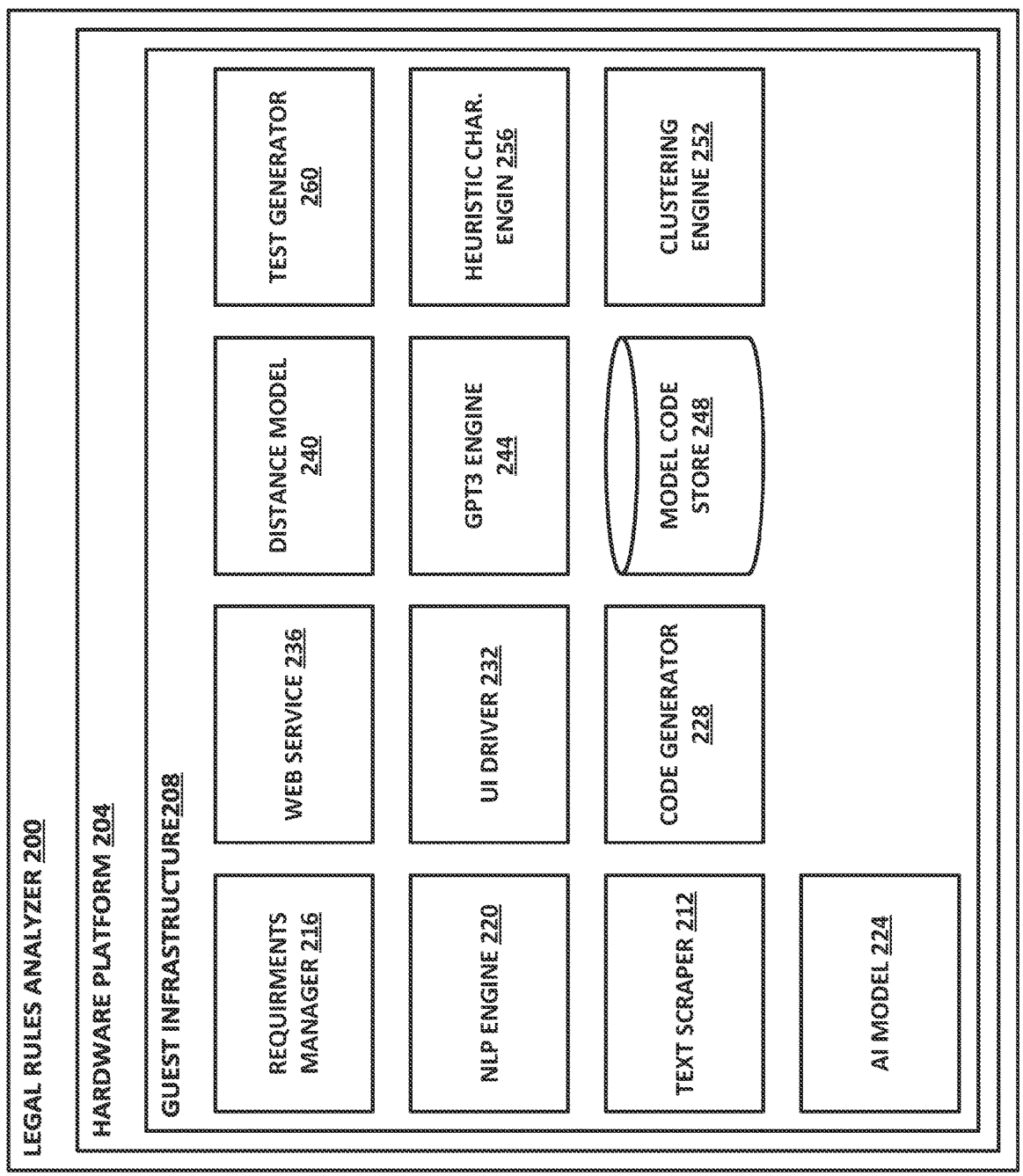
FIG. 2 is a block diagram of selected elements of a legal rules analyzer.

FIG. 2 is a block diagram of selected elements of a legal rules analyzer 200. In this illustration, legal rules analyzer 200 is shown as a single logical unit on a single hardware platform 204. Hardware platform 204 may be an example of a hardware platform as illustrated in FIG. 8 below. Hardware platform 204 may provide the necessary processors, memories, storage, accelerators, or other hardware services to implement the functions of legal rules analyzer 200. Although legal rules analyzer 200 is illustrated as a single logical unit in this FIGURE, this does not imply that each of the functional units illustrated below must necessarily coexist on the same hardware platform or in the same infrastructure. Rather, these elements are shown together for convenience and to illustrate how certain elements may interoperate. The individual elements or functions may be hosted on a common hardware platform together or in a variety of hardware platforms across data centers, cloud services, or other services.

Legal rules analyzer 200 may host a guest infrastructure 208 on one or more hardware platforms 204. Guest infrastructure 208 may provide the infrastructure for separating logical compute units. For example, guest infrastructure 208 could include a virtualization or containerization infrastructure to host one or more virtual machines, containers, pods, microservices, or other guest services. The functional elements illustrated herein may be of a single type or of mixed types. Furthermore, one or more functions could be hosted on a dedicated (i.e., non-virtualized) appliance, a hardware accelerator, or any other suitable infrastructure.

Legal rules analyzer 200 includes various functions, such as a text scraper 212, a requirements manager 216, an NLP engine 220, and AI model 224, a code generator 228, a UI driver 232, a web service 236, a distance model 240, a GPT-3 engine 244, a model code store 248, a clustering engine 252, a heuristic characterization engine 256, and a test generator 260, by way of illustrative and nonlimiting example. In various embodiments, some or all of the elements illustrated here may be omitted. Furthermore, in various embodiments, additional elements may be present to provide additional services.

Text scraper 212 may be provided to populated a database with the text of various laws, regulations, rules, or other text that is to be compared. Text scraper 212 may, for example, query the website of a jurisdiction, such as a US state, and may identify a section of the website that hosts laws or regulations, such as a traffic code. Text scraper 212 may then extract the relevant text from that portion of the website and store it in a database.

Requirements manager 216 may include extracted requirements from the various laws. For example, the "JAMA" software package is a commercial requirements tracking system that provides linkages between various requirements and their sources, such as a statute. Another popular software package is IBM DOORS. JAMA may be capable of exporting requirements so that those requirements can then be used in a system, or the requirements or linkages may be accessible via API calls to the JAMA software. In addition to or instead of requirements manager 216, the system could also use a database of text statutes or information that may be gathered by other means, such as via crowdsourcing.

An NLP engine 220 provides NLP services for the system. NLP may include tokenizing or lemmatizing text extracted by text scraper 212. NLP engine 220 may extract the meaning of each word and may also extract the meaning of each sentence. In this context, a sentence could be a true grammatical sentence or it could be an ad hoc sentence created specifically for the analysis disclosed herein. For example, in one embodiment, the system uses the first N words of a statute as a single sentence. The first N words may expressly include the title of the statute. Different jurisdictions title their statutes differently but they may have similar meaning. Thus, the title or other metadata may be included as part of the first N words of the statute text. In one illustrative embodiment, N equals 400.

In some embodiments, an AI model 224, such as a neural network, may aid NLP engine 220 in extracting the meaning of words or sentences. For example, a neural network may analyze groups of words, according to a trained model, and the meaning may be extracted from the last layer of the neural network.

One purpose of NLP engine 220 is to understand the text, for example, so that the law can be appropriately categorized. Thus, AI model 224 may include a classification algorithm to assign the statute being analyzed to an appropriate classification or category. NLP engine 220 may also be used to determine the similarity between two statutes and to identify the differences between the statutes.

Code generator 228 may provide suggestions or recommendations for implementing certain legal requirements as a function. For example, code generator 228 may specify the function of a procedure that carries out the compliance. Code generator 228 may also parameterize variables that are identified within the statute. For example, variables could include following distance, stopping times, distance to stop from a red light or a stop sign, when and how long to signal when changing lanes, or other statutory or regulatory requirements. Code generator 228 may help to define APIs that can be used to hook into various functions. Code generator 228 can also suggest to a systems engineer which variables may be parameters that can be passed when the function is called. This can help the system programmer to build the API.

A UI driver 232 may be provided to display a user interface that enables a programmer, systems engineer, or other operator to interact with the system. An illustrative and nonlimiting example of UI elements are provided in FIG. 7 below.

In some cases, the UI may be provided as a local or native widget-based UI that runs on a local system. In other cases, a human operator may access the system via a web browser. Thus, a web service 236 may be provided to serve webpages and to provide the UI.

Distance model 240 (which in some embodiments may be part of NLP engine 220) is used to compute the distance between two statutes. The two statutes may be identified as belonging to the same category. The text of the statutes may be parsed and processed as described herein, and distance model 240 may compute a distance or similarity between the two statutes. This may include, by way of illustrative and nonlimiting example, a cosine distance, a Jaccard distance, or some other mathematical distance.

Clustering engine 252 may use the distance between various statutes to form clusters. For example, if a group of statutes are identified with a mean distance between each other (or alternatively from a center of mass of the cluster) that is less than the distance to another statute determined to be outside of the cluster, then the statutes may be considered as groupable together. Grouping the statutes together can help to perform additional analysis on more similar statutes.

In some examples, heuristic characterization may also be used to classify certain statutes. For example, section headings, crowdsource data, historical information, or other heuristic data may be used to classify statutes. This can help to supplement the work performed by NLP engine 220 and AI model 224.

A GPT-3 engine 244 may be used in some cases to generate model codes, which may then be stored in a model code store 248. For example, once data are collected from sufficient existing jurisdictions, GPT-3 engine 244 may be used to draft a model law that encompasses elements from the individual laws. These model laws may be stored in a model code store 248. The model laws could then be used to propose a comprehensive model law, such as a uniform traffic code.

A test generator 260 may also be provided. Test generator 260 may determine parameters for testing according to the results of NLP analysis in NLP engine 220. Test generator 260 may also operate GPT-3 engine 244 to write a test description. Test generator 260 may identify clusters of laws that can be usefully tested together. Furthermore, test generator 260 may also identify a strictest rule among a cluster of laws if such a strictest rule can be usefully identified. Thus, test generator 260 may generate a test that complies with the strictest rule and thus may further prove compliance with less strict rules in the same set.

Figure 3:
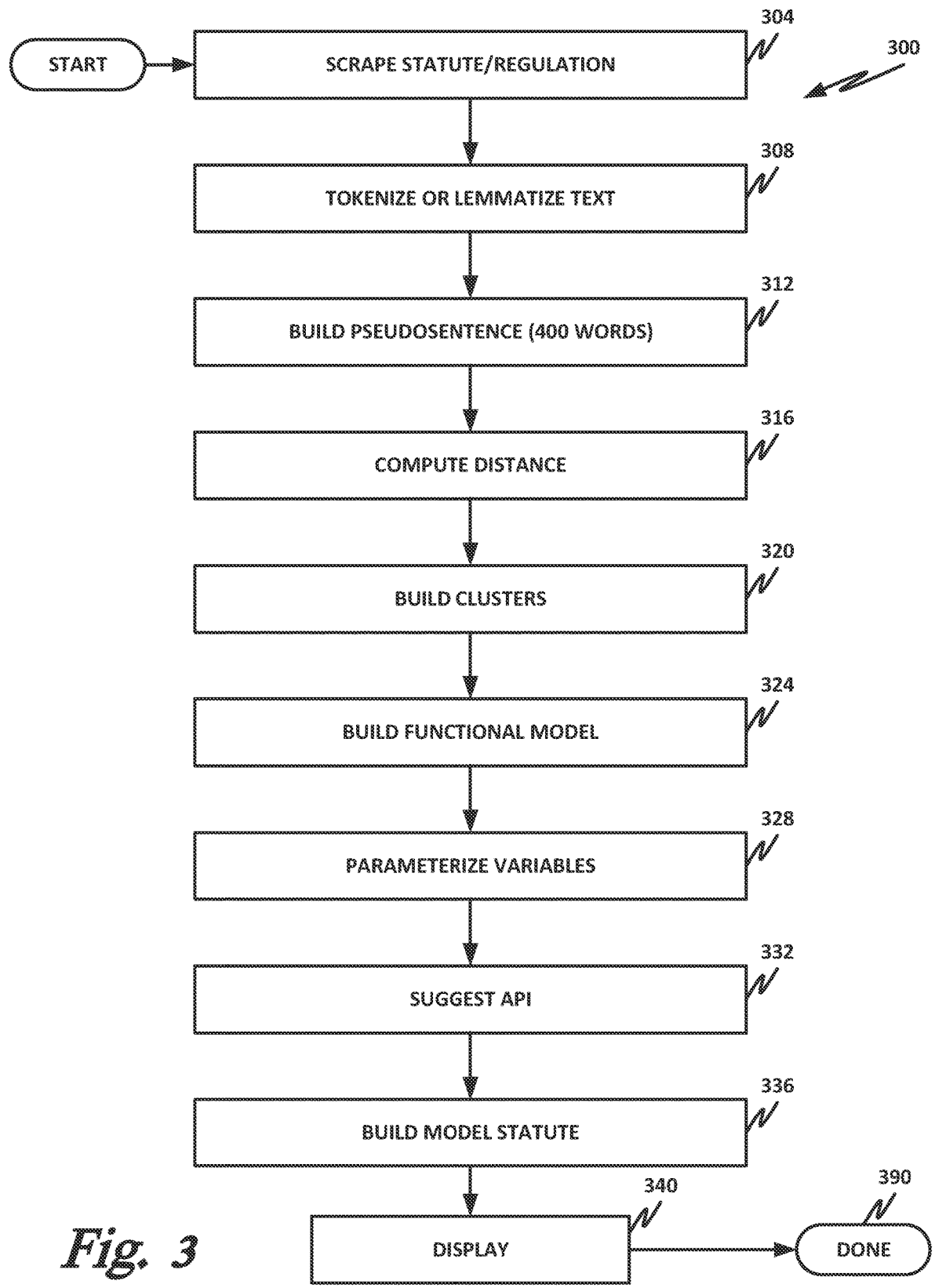
FIG. 3 is a flowchart of a method of analyzing a statute.

FIG. 3 is a flowchart of a method 300 of analyzing a statute. Starting in block 304, the system may first scrape the statute or regulation text from a website, such as a website provided by the state or jurisdiction that passed the law.

In block 308, the text of the lot may be tokenized and/or lemmatized as appropriate.

In block 312, the system may build a pseudo-sentence. This is referred to as a pseudo-sentence because it may not be a strict grammatical sentence. Rather, the pseudo-sentence may include the first N words within the statute, such as the first 400 words. In some embodiments, the pseudo-sentence may also include the title of the statute because titles of statutes are not consistent across jurisdictions. Other metadata may also be considered, such as short title, description, taxonomy (e.g., the volume or code that the statute appears in, and the headings for sections or subsections), or any other information that may be useful in inferring the meaning of a statute. Thus, the title may both provide useful information and may be tokenized and compared to other titles.

In block 316, the system computes the distance between various points in the system or, in other words, between various statutes. This may include first assigning the statutes to classes or categories so that statutes with some similarity may be compared. If statutes or categories are not known yet, then the system may use method 300 to determine the category or class.

In this block, the system may use an appropriate algorithm to compute the distance between various statutes to determine how the statutes may be grouped or clustered.

In block 320, the system may build a plurality of clusters according to the computed distances between the statutes, regulations, or rules.

In block 324, the system may build a functional model, such as determining what actions may be necessary to comply with the statute.

In block 328, the system may also parameterize variables identified as having a common type across a number of statutes but variable specifications.

In block 332, the system may suggest an API, such as by suggesting that a particular statute be the subject of a function and also by suggesting parameters or other data that may be used in the function.

After suggesting API, in block 336, the system may also build a model statute to form the basis of a model law.

In block 340, the system may display appropriate elements to the human user via a UI.

Various other actions or steps may be carried out by a system of the present specification and should be understood to also be within the scope of method 300. Various actions or operations are discussed throughout this specification.

In block 390, the method is done.

Figure 4:
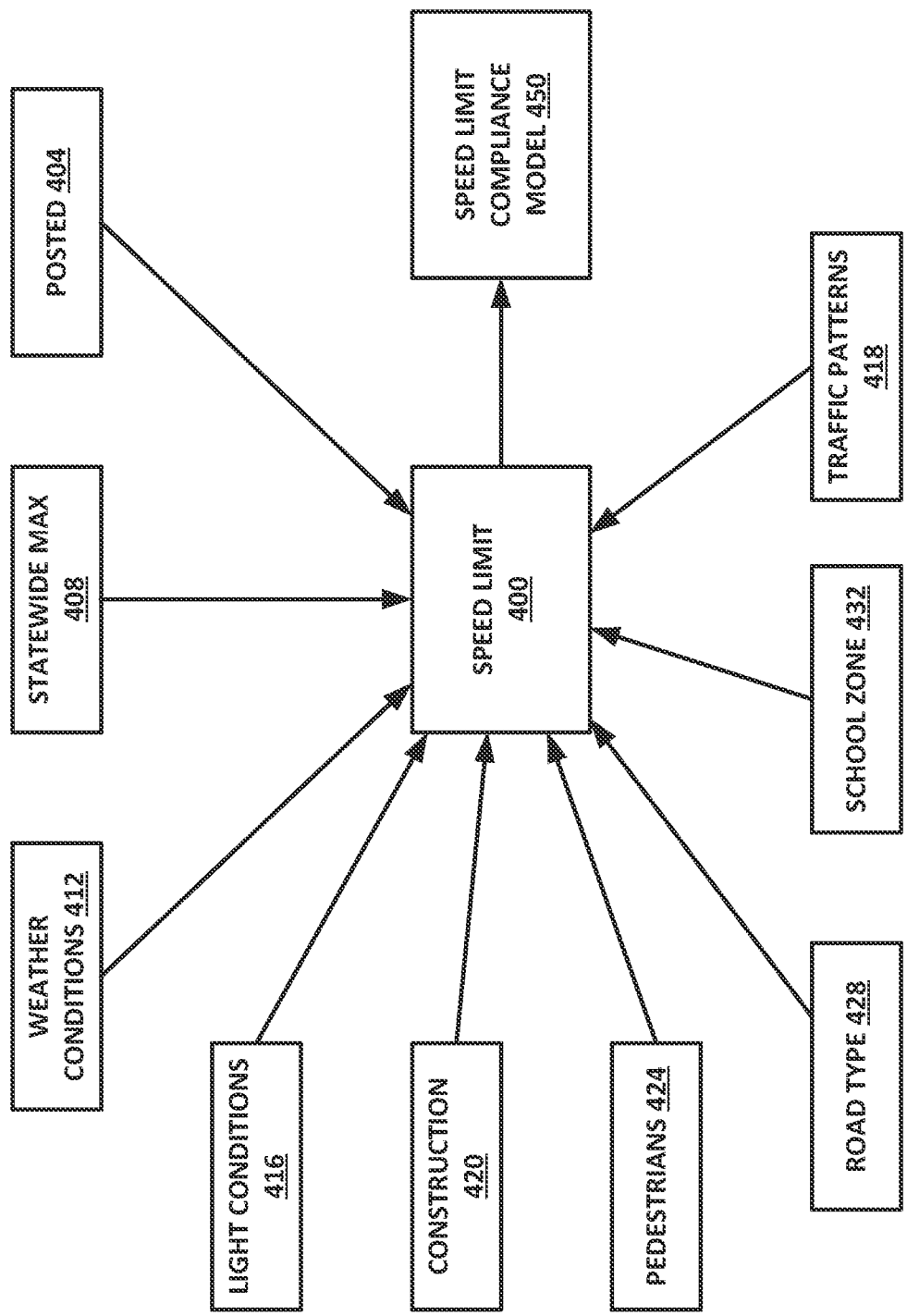
FIG. 4 is a block diagram of a legal compliance limit.

FIG. 4 is a block diagram of a legal compliance limit 400. The block diagram of FIG. 4 is provided to illustrate that various factors may affect legal compliance even in the case of what seems like an otherwise straightforward requirement. In this case, the legal speed limit is used as an example as the legal compliance limit 400.

In most places, the designated speed limit is visibly posted on signs next to the road. A highly naïve analysis may simply determine that the legal requirement is to drive at a speed less than the speed posted on the site. However, in many jurisdictions, speed limits are not fixed quantities, but rather the posted speed limit is a maximum legal speed that may be adjusted downward under various conditions.

Conditions that may affect speed limit include the posted speed limit 404 as well as other factors. For example, there may be a statewide maximum speed limit of 408. Thus, the speed limit (example of the legal compliance limit 400) cannot exceed the maximum statewide speed limit 408.

Weather conditions 412 may also affect the legal speed limit. For example, the posted speed limit may assume clear roads and normal driving conditions. Weather can affect that. Similarly, light conditions 416 and traffic patterns 418 may also affect the legal speed limit.

In many cases, construction 420 may also reduce the speed limit as well as increasing penalties for failing to comply with the speed limit. The presence of pedestrians

424 may also affect the appropriate speed at which the user may operate the vehicle. The type of road 428 may also be relevant. For example, many jurisdictions have different speed limits for interstate highways, state highways, rural highways, and residential neighborhoods.

A school zone 432 may also affect the speed limit at certain times of day. For example, in many jurisdictions, a school zone may have a maximum speed of 15 to 20 miles an hour, but this reduced speed limit is enforced only at certain times of the day and only when school is in. Thus, the speed limit may be affected not only by the presence of a school zone but also by school attendance patterns, by the time of day, and by the time of year.

Furthermore, many states have a basic speed limit law which may further affect or adjust the legal speed limit.

Thus, speed limit 400 may be a nontrivial computation and these factors may vary from jurisdiction to jurisdiction. The system and method disclosed herein may analyze these various factors in statutes across multiple jurisdictions and, based upon those factors, may build a speed limit compliance model 450. Speed limit compliance model 450 may account for a posted speed limit and may also adjust the posted speed limit according to various factors as illustrated herein. If the system determines that multiple jurisdictions share common factors but differ in the implementation details, then the system may parameterize that variable so that the function itself can be genericized.

Figure 5:
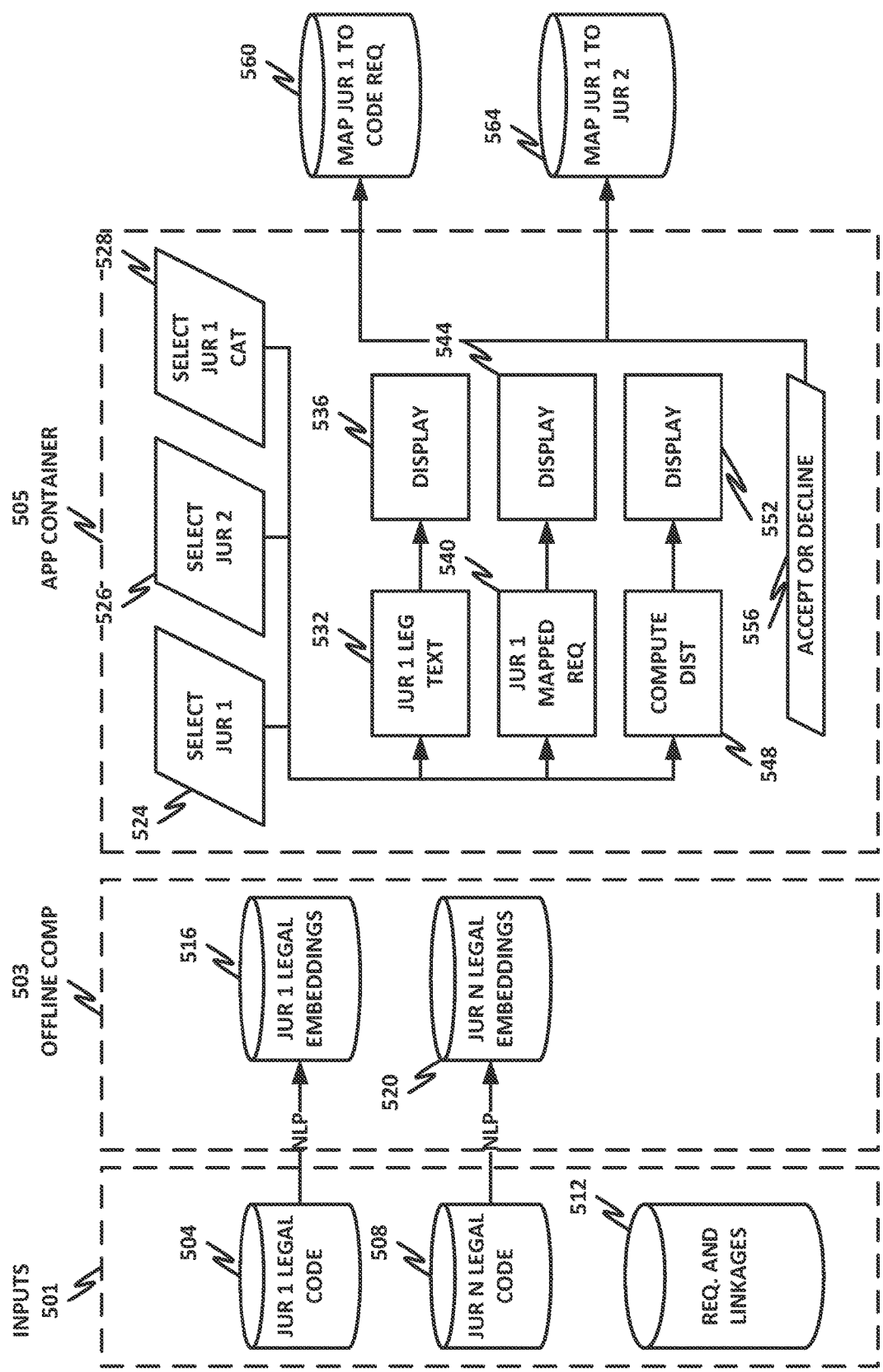
FIG. 5 is a block diagram of selected aspects of a textual analysis.

FIG. 5 is a block diagram of selected aspects of a textual analysis. The textual analysis of 500 is divided here into three discrete phases, namely an input phase inputs) 501, an offline computation phase (offline computation) 503, and an application container phase (application container) 505. Inputs 501 are received, and then certain aspects may be computed offline in offline computation 503. An application container 505 may then carry out certain real-time functions when a user operates the system.

Inputs 501 include jurisdictional 1 legal code 504 through jurisdiction N legal code 508. For example, the United States may provide at least 50 discrete legal jurisdictions. Inputs 501 may also include requirements and a map 512 linking of jurisdiction 1 legal code to requirements. For example, the system may export linked requirements from a software solution such as JAMA. These linked requirements may correlate particular desired behavior (e.g., "come to a complete stop at a stop sign") to associated sections of the statute (e.g., California Vehicle Code 1.23 links to the requirement to come to a complete stop at a stop sign).

Offline computation 503 includes certain analysis or processing of the legal codes. For example, in block 516, jurisdiction 1 legal code embeddings are inferred via an NLP model that analyzes jurisdiction 1 legal code 504. The embeddings may include features identified, inferred, or extracted during the NLP or other machine learning analysis. Similarly, an NLP model analyzes legal code 508 to provide jurisdiction N legal code embeddings 520.

Application container 505 may then use these data to compute distances and make comparisons. For example, in block 524, a user operating a UI may select jurisdiction 1. In block 526, the user may select jurisdiction 2. In operation 528, the user may select a jurisdiction 1 category or section. For example, the user may select the CVC as a baseline, and may select a section that deals with speed limits and its variations. The user may also select another jurisdiction, such as Indiana, for comparison.

In block 532, the system looks up the jurisdiction 1 legal text, such as by finding the requested statute by section or similar.

In block 540, the system looks up the requirements mapped to the selected section of the legal code. This may include requirements that were inferred from an analysis of the legal code, or that were linked from a requirements software.

In block 536, the system may display the legal text of the selected statute to the user. In block 544, the system may also display linked requirements for this section of the legal code (e.g., factors that affect the speed limit, exceptions, etc.).

In block 548, the system may compute the distance to legal requirements in jurisdiction 2 (in this example, Indiana). For example, the system may compute a normalized similarity between a relevant statute in jurisdiction 1 (California) and a corresponding statute in jurisdiction 2 (Indiana). It may be assumed that the statute with the shortest distance is likely to be the corresponding statute in jurisdiction 2 (Indiana).

In block 552, the system may display the jurisdiction 2 legal identifier, the legal text, and a match score, which may be normalized.

In block 556, the user may be permitted to accept or decline the match. This may be useful because the system may make mistakes in identifying corresponding legal requirements. Thus, corrective action may be taken and models may be improved. This increases the likelihood that, in a future operation, the correct legal code or section of the legal code will be returned.

In embodiments, the user may also be able to select a best match from a list of candidates. Acceptance of one or more candidates may be at the user's discretion, and in some cases, the accepted linkage can be recorded in external software, such as JAMA or DOORS. This may be recorded via an API call, or the acceptance may be recorded via a log or report that can be sent and processed.

In block 560, the system may display a map linking jurisdiction 1 legal code to the inferred requirements. In block 564, the system may display a map linking jurisdiction 1 legal code to jurisdiction 2 legal code. This provides a useful display for the human user to compare the laws in the jurisdictions and to make appropriate systems engineering or programming decisions.

Figure 6:
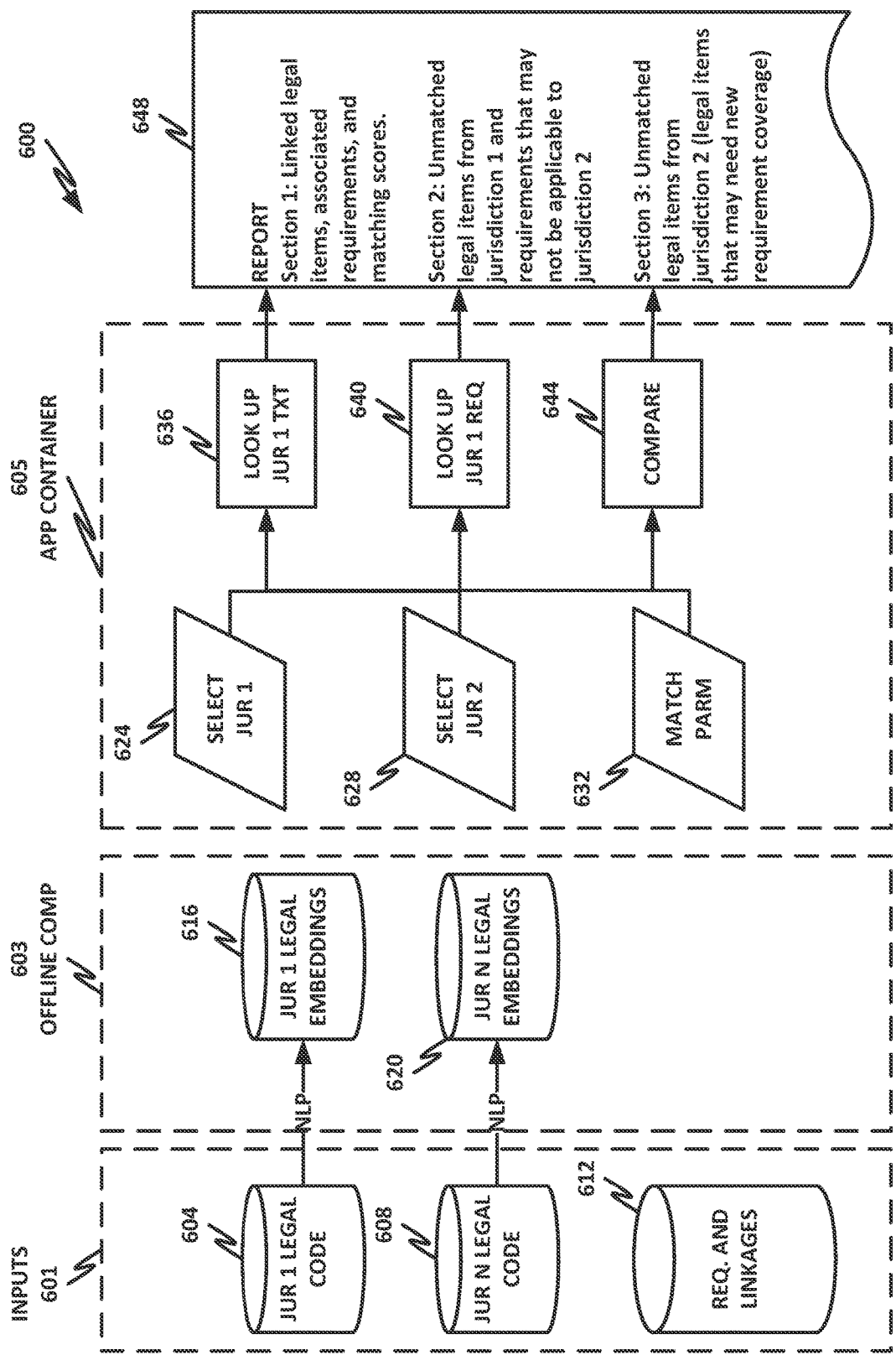
FIG. 6 is a block diagram of selected additional elements of computation that may be performed by a system of the present specification.

FIG. 6 is a block diagram of selected additional elements of computation 600 that may be performed by a system of the present specification.

Once again, the operation may be divided into three phases, namely inputs 601, offline computation 603, and an application container 605.

Again, as before, inputs 601 may include a jurisdiction 1 legal code 604, a jurisdiction N legal code 608, and requirements and map linking jurisdiction 1 legal code to requirements 612.

Again, as before, an offline computation may include NLP processing. Jurisdiction 1 legal code 604 is processed via an NLP engine to provide jurisdiction 1 legal code embeddings 616. Jurisdiction N legal code 608 may be processed via the same NLP engine to provide jurisdiction N legal code embeddings 620.

Within application container 605, at block 624, the user selects jurisdiction 1. At block 628, the user selects jurisdiction 2. In block 632, the user requests matching parameters. Alternatively, there may be default parameters associated with a statute, which may represent a known or verified set of parameters.

In block 636, the system looks up the jurisdiction 1 legal text. In block 640, the system looks up requirements mapped to legal item 1 from the jurisdiction 1 legal text.

In block 644, the system computes similarities to legal items in jurisdiction 2.

Based on these inputs, the system may build a functional model for the selected compliance category. For example, the system may infer a functional model for complying with speed limit restrictions across a plurality of jurisdictions. The system may also infer variables that may be used as calling parameters for the function, which can help to make the function more generic for multiple jurisdictions. The system may also identify parameters or requirements that do not map well between the jurisdictions.

At block 648, the system provides a report. For example, the report may have multiple sections. In section 1, the system provides linked legal items, associated requirements, and matching scores. In section 2, the system provides unmatched legal items from jurisdiction 1 and requirements that may not be applicable in jurisdiction 2. In section 3, the system may provide unmatched legal items from jurisdiction 2 and legal items that may need new requirement coverage. This may aid the system programmer in determining APIs and functions.

Figure 7:
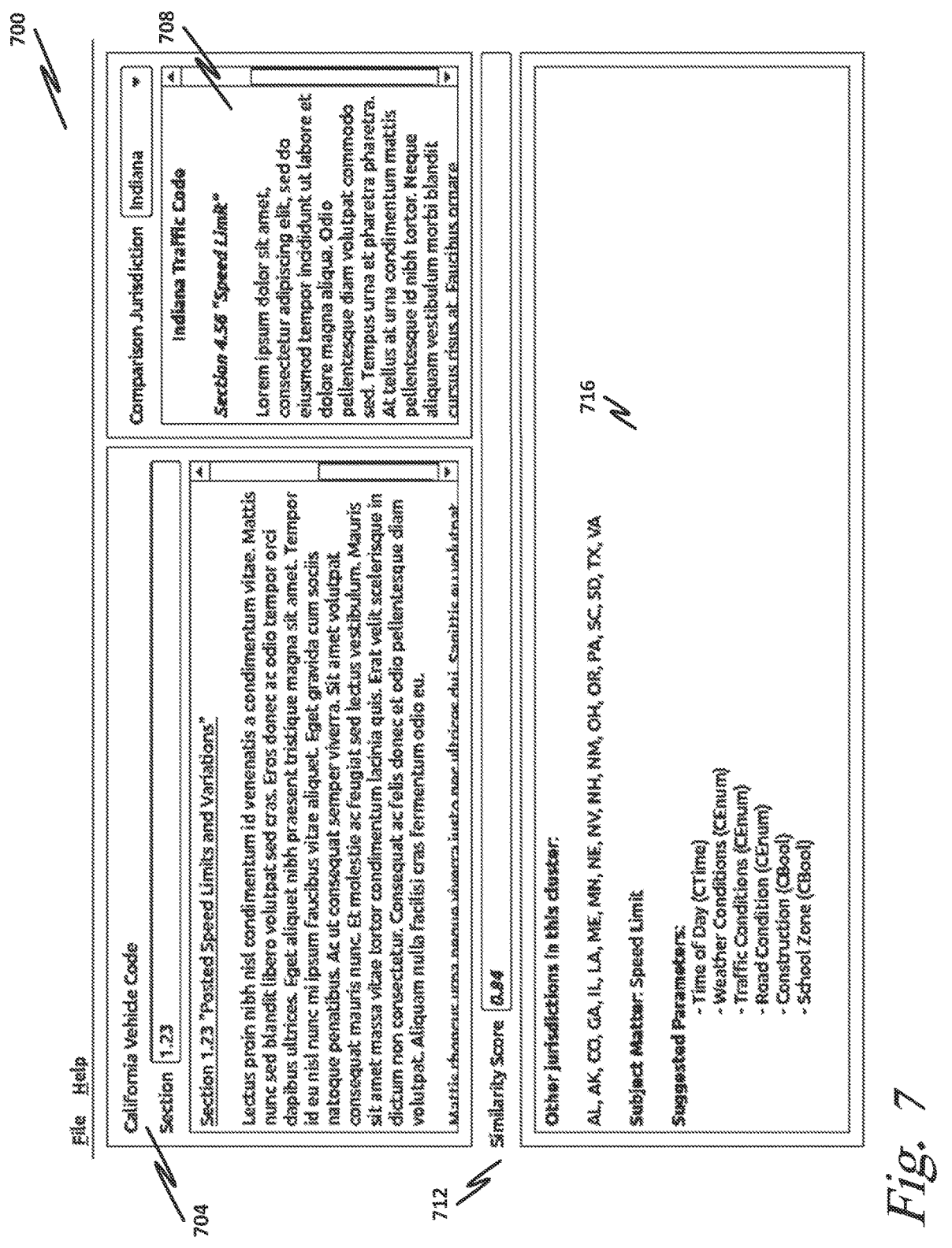

FIG. 7 is a block diagram of selected elements of an illustrative UI 700. UI 700 is provided as an illustration of inputs and outputs that may be used according to the present specification. In this example, a California-based systems engineer may access UI 700. Because California is the base of operations, the CVC is used as the baseline for comparison. In other words, in this example, sections of the CVC have been analyzed and turned into linked requirements. These linked requirements are used as a baseline for comparison with other jurisdictions, such as other US states. The user may select a particular section from the CVC. In block 704, the system may display the text of the California legal code, along with linked requirements derived from that section of code.

At user elements 708, the user may select another jurisdiction for comparison to this section of the California legal code. For example, the user may request the state of Indiana. The system may then check the database for Indiana statutes that are found to be functionally similar to section 1.23 of the CVC. In this case, section 4.56 of the Indiana traffic code is identified as the corresponding section. Thus, the text of the Indiana traffic code may be displayed and may be associated with linked requirements from the CVC. For example, if the Indiana traffic code has been found to have certain sections that map to requirements, those requirements may be displayed.

At block 712, the UI also displays a similarity score. This may be a normalized score indicating how close the two statutes are to one another. In this case, by way of example, Indiana traffic code section 4.56 has a similarity index of 0.84 to CVC in block 704. This indicates a relatively strong similarity with a relatively high confidence that the statutes are analogous and that they will share some common features.

Element 716 provides additional information, such as a report. In this case, the system has created a number of clusters and provides a list of other jurisdictions in the cluster. This is a list of jurisdictions that have a statute that maps strongly to this section of the CVC and that may usefully be combined for functional compliance purposes.

Element 716 also illustrates the subject matter of the statute. In this case, the system has determined that the subject matter is speed limits. This can be derived from linked requirements or may be inferred from the NLP algorithm.

Furthermore, in this embodiment, the system has suggested parameters along with various data types. For example, the time of day may affect the speed limit and may be a time object. Weather conditions, traffic conditions, and road conditions may be selected from enumerated lists of relative conditions. Furthermore, Boolean variables are illustrated as construction or school zone. This parameterization may aid a systems engineer in designing a functional API, including appropriate parameters and data types.

FIG. 8 is a block diagram of a hardware platform 800. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, as well as for other computing elements illustrated throughout this specification, such as legal rules analyzer 200 of FIG. 2. Depending on the embodiment, elements of hardware platform 800 may be omitted, and other elements may be included.

Hardware platform 800 is configured to provide a computing device. In various embodiments, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 816 may be in communication with a bus 828 via an interface circuit. Bus 828 may have one or more devices that communicate over it, such as a bus bridge 832, I/O devices 835, accelerators 846, and communication devices 840 by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications. In a particular example, communication device 840 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, then a different protocol, such as TCP may be preferred.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), and/or accelerators 846. In alternative embodiments, any portions of the bus architectures could be implemented with one or more PtP links.

Operating system 806 may be, for example, Microsoft Windows, Linux, UNIX, Mac OS X, IOS, MS-DOS, or an embedded or real-time operating system (including embedded or real-time flavors of the foregoing). For real-time systems such as an AV, various forms of QNX are popular. In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

There are described throughout this specification various engines, modules, agents, servers, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an Ethernet cable, other cable, or waveguide), or a wireless transceiver.

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Selected Examples

There is disclosed in an example, a computer-aided method of comparing legal requirements, comprising: comparing a first legal requirement from a first jurisdiction to a second legal requirement from a second jurisdiction, comprising applying a natural language processing (NLP) algorithm to the first and second legal requirements; computing a distance between the first and second legal requirements; determining from the distance that the second legal requirement belongs to a same subject matter category as the first legal requirement; and providing a UI to display the first and second legal requirements to a user.

There is further disclosed an example of the method, further comprising displaying the computed distance.

There is further disclosed an example, further comprising displaying via the UI one or more related laws distinct to the first jurisdiction or second jurisdiction There is further disclosed an example wherein the first and second legal requirements are statutes.

There is further disclosed an example wherein the first and second legal requirements are regulations.

There is further disclosed an example wherein the first and second legal requirements are non-government rules.

There is further disclosed an example further comprising exporting linkages from a requirements tracking software, and associated the linkages with the first and second legal requirements.

There is further disclosed an example wherein computing the distance comprises computing a cosine distance.

There is further disclosed an example wherein computing the distance comprises computing a Jaccard distance.

There is further disclosed an example further comprising computing a distance for a plurality of legal requirements from a plurality of jurisdictions, determining that the plurality of legal requirements belong to the same subject matter category, and clustering the plurality of legal requirements by similarity.

There is further disclosed an example further comprising identifying a strictest rule for a cluster, and displaying via the UI the strictest rule.

There is further disclosed an example further comprising generating a model statute from the plurality of legal requirements.

There is further disclosed an example further comprising inferring a functional definition for the subject matter category, and providing the inferred functional definition via the UI in a human-readable form.

There is further disclosed an example further comprising inferring a recommended parameterization for the functional definition, and providing the inferred recommended parameterization via the UI.

There is further disclosed an example further comprising generating a test protocol for the subject matter.

There is further disclosed an example wherein the NLP algorithm analyzes the first and second legal requirements as one or more sentences.

There is further disclosed an example wherein the NLP algorithm treats a first N words of the first and second legal requirements as a pseudo-sentence.

There is further disclosed an example wherein N is approximately 400.

There is further disclosed an example wherein the first N words include a title.

There is further disclosed an example of an apparatus comprising means for performing the method.

There is further disclosed an example wherein the means for performing the method comprise a processor and a memory.

There is further disclosed an example wherein the memory comprises machine-readable instructions that, when executed, cause the apparatus to perform the method.

There is further disclosed an example wherein the apparatus is a computing system.

There is further disclosed an example of at least one computer-readable medium comprising instructions that, when executed, implement a method or realize an apparatus as claimed.

There is further disclosed an example of a computing apparatus, comprising: a hardware platform comprising a processor circuit and a memory; and instructions encoded within the memory to instruct the processor circuit to: receive a first compliance requirement from a first jurisdiction; receive a second compliance requirement from a second jurisdiction; apply a machine learning algorithm to the first and second compliance requirements to compute a distance between the first and second compliance requirements; and display via a user interface (UI) the first compliance requirement, the second compliance requirements, and the distance.

There is further disclosed an example wherein the machine learning algorithm comprises natural language processing (NLP).

There is further disclosed an example wherein the machine learning algorithm comprises a neural network.

There is further disclosed an example wherein the first and second compliance requirements are statutes.

There is further disclosed an example wherein the first and second compliance requirements are regulations.

There is further disclosed an example wherein the first and second compliance requirements are non-government rules.

There is further disclosed an example wherein the instructions are further to export linkages from a requirements tracking software, and associated the linkages with the first and second compliance requirements.

There is further disclosed an example wherein computing the distance comprises computing a cosine distance.

There is further disclosed an example wherein computing the distance comprises computing a Jaccard distance.

There is further disclosed an example wherein the instructions are further to compute a distance for a plurality of compliance requirements from a plurality of jurisdictions, determining that the plurality of compliance requirements belong to a common subject matter category, and cluster the plurality of compliance requirements by similarity.

There is further disclosed an example wherein the instructions are further to identify a strictest rule for a cluster, and display via the UI the strictest rule.

There is further disclosed an example wherein the instructions are further to generate a model statute from the plurality of compliance requirements.

There is further disclosed an example wherein the instructions are further to generate a test protocol for the common subject matter category.

There is further disclosed an example wherein the instructions are further to determine that the first and second compliance requirements belong to a common subject matter category, infer a functional definition for the common subject matter category, and provide the inferred functional definition via the UI in a human-readable form.

There is further disclosed an example wherein the instructions are further to infer a recommended parameterization for the functional definition, and providing the inferred recommended parameterization via the UI.

There is further disclosed an example wherein the machine learning algorithm analyzes the first and second compliance requirements as one or more sentences.

There is further disclosed an example wherein the machine learning algorithm treats a first N words of the first and second compliance requirements as a pseudo-sentence.

There is further disclosed an example wherein N is approximately 400.

There is further disclosed an example wherein the first N words include a title.

There is further disclosed an example of one or more tangible, non-transitory computer-readable storage media having stored thereon instructions executable on one or more processors, the instructions to instruct the one or more processors to: apply natural language processing (NLP) to a first legal requirement from a first jurisdiction; apply NLP to a second legal requirement from a second jurisdiction; compute a distance between the first and second legal requirements according to results of the NLP; assign the first and second legal requirements to a common subject matter category according to the distance; and display via a user interface (UI) the first legal requirement, the second legal requirements, and the distance.

There is further disclosed an example, wherein the first and second legal requirements are statutes.

There is further disclosed an example, wherein the first and second legal requirements are regulations.

There is further disclosed an example, wherein the first and second legal requirements are non-government rules.

There is further disclosed an example, wherein the instructions are further to export linkages from a requirements tracking software, and associated the linkages with the first and second legal requirements.

There is further disclosed an example, wherein computing the distance comprises computing a cosine distance.

There is further disclosed an example, wherein computing the distance comprises computing a Jaccard distance.

There is further disclosed an example, wherein the instructions are further to compute a distance for a plurality of legal requirements from a plurality of jurisdictions, determining that the plurality of legal requirements belong to the common subject matter category, and cluster the plurality of legal requirements by similarity.

There is further disclosed an example, wherein the instructions are further to identify a strictest rule for a cluster, and display via the UI the strictest rule.

There is further disclosed an example, wherein the instructions are further to generate a model statute from the plurality of legal requirements.

There is further disclosed an example, wherein the instructions are further to infer a functional definition for the common subject matter category, and provide the inferred functional definition via the UI in a human-readable form.

There is further disclosed an example, wherein the instructions are further to infer a recommended parameterization for the functional definition, and provide the inferred recommended parameterization via the UI.

There is further disclosed an example, wherein the instructions are further to generate a test protocol for the common subject matter.

There is further disclosed an example, wherein the NLP is to analyze the first and second legal requirements as one or more sentences.

There is further disclosed an example, wherein the NLP is to treat a first N words of the first and second legal requirements as a pseudo-sentence.

There is further disclosed an example, wherein N is approximately 400.

There is further disclosed an example, wherein the first N words include a title.

Variations and Implementations

As will be appreciated by one skilled in the art, aspects of the present disclosure described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." In at least some cases, a "circuit" may include both the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A computer-aided method of comparing legal requirements, comprising:
    operating an autonomous vehicle to drive along a roadway;
    comparing a first legal requirement from a first jurisdiction to a second legal requirement from a second jurisdiction, comprising applying a natural language processing (NLP) algorithm to the first and second legal requirements;
    computing a distance between the first and second legal requirements;
    determining from the distance that the second legal requirement belongs to a same subject matter category as the first legal requirement;
    inferring a functional definition for the subject matter category;
    inferring a recommended parameterization for the functional definition; and
    instructing an autonomous vehicle controller of the autonomous vehicle to set a driving behavior in accordance with the recommended parameterization.

2. The computer-aided method of claim 1, further comprising providing a user interface (UI) to display the first and second legal requirements to a user, and displaying the computed distance.

3. The computer-aided method of claim 1, wherein the first and second legal requirements are statutes.

4. The computer-aided method of claim 1, wherein the first and second legal requirements are regulations or non-governmental rules.

5. The computer-aided method of claim 2, further comprising displaying one or more related laws distinct to the first jurisdiction or second jurisdiction.

6. The computer-aided method of claim 1, further comprising exporting linkages from a requirements tracking software, and associated the linkages with the first and second legal requirements.

7. The computer-aided method of claim 1, wherein computing the distance comprises computing a cosine or Jaccard distance.

8. The computer-aided method of claim 1, further comprising computing a distance for a plurality of legal requirements from a plurality of jurisdictions, determining that the plurality of legal requirements belong to the same subject matter category, and clustering the plurality of legal requirements by similarity.

9. The computer-aided method of claim 8, further comprising identifying a strictest rule for a cluster and generating parameters based on the strictest rule for the cluster, the instructing the autonomous vehicle controller of the autonomous vehicle to set the driving behavior is further in accordance with the generated parameters based on the strictest rule.

10. The computer-aided method of claim 2, further comprising providing the inferred functional definition via the UI in a human-readable form.

11. The computer-aided method of claim 10, further comprising providing the inferred recommended parameterization via the UI.

12. The computer-aided method of claim 1, wherein the NLP algorithm treats a first N words of the first and second legal requirements as a pseudo-sentence, wherein N is approximately 400, and wherein the first N words include a title.

13. A system for parameterizing requirements for an autonomous vehicle, comprising:
    a hardware platform comprising a processor circuit and a memory;
    instructions encoded within the memory to instruct the processor circuit to:
        receive a first compliance requirement from a first jurisdiction;
        receive a second compliance requirement from a second jurisdiction;
        apply a machine learning algorithm to the first and second compliance requirements to compute a distance between the first and second compliance requirements;
        generate an autonomous vehicle parameter based on the computed distance between the first and second compliance requirements; and
        instruct the autonomous vehicle to modify a driving behavior in accordance with the generated autonomous vehicle parameter; and
    the autonomous vehicle, the autonomous vehicle comprising an onboard computer configured to:
        navigate the autonomous vehicle to drive along a roadway, including performing the modified driving behavior in accordance with the generated autonomous vehicle parameter.

14. The computing apparatus of claim 13, wherein the machine learning algorithm comprises natural language processing (NLP).

15. The computing apparatus of claim 14, wherein the machine learning algorithm comprises a neural network.

16. The computing apparatus of claim 13, wherein the instructions are further to compute a distance for a plurality of compliance requirements from a plurality of jurisdictions, determining that the plurality of compliance requirements belong to a common subject matter category, and cluster the plurality of compliance requirements by similarity.

17. The computing apparatus of claim 16, wherein the instructions are further to generate a model statute from the plurality of compliance requirements.

18. The computing apparatus of claim 16, wherein the instructions are further to generate a test protocol for the common subject matter category.

19. One or more tangible, non-transitory computer-readable storage media having stored thereon instructions executable on one or more processors, the instructions to instruct the one or more processors to:
    operate an autonomous vehicle to drive along a roadway;
    apply natural language processing (NLP) to a first legal requirement from a first jurisdiction;
    apply NLP to a second legal requirement from a second jurisdiction;

compute a distance between the first and second legal requirements according to results of the NLP;

assign the first and second legal requirements to a common subject matter category according to the distance;

build a functional model for the common subject matter category based on the results of the NLP and the computed distance between the first and second legal requirements; and instruct an autonomous vehicle controller of the autonomous vehicle to modify a driving behavior in accordance with the functional model.

20. The one or more tangible, non-transitory computer-readable media of claim 19, wherein the first and second legal requirements are statutes.

* * * * *